(12) United States Patent
Wilson et al.

(10) Patent No.: US 12,479,968 B2
(45) Date of Patent: Nov. 25, 2025

(54) PROCESS FOR FRAGMENTING A POLYMER

(71) Applicant: SPECIALTY OPERATIONS FRANCE, Lyons (FR)

(72) Inventors: David James Wilson, Coye-la-Forêt (FR); Alexander Lerch, Gelnhausen (DE); Fan Jiang, Yunnan (CN); Bing Hong, Shanghai (CN); Stephane Streiff, Shanghai (CN)

(73) Assignee: SPECIALTY OPERATIONS FRANCE, Lyons (FR)

( * ) Notice: Subject to any disclaimer, the term of this patent is extended or adjusted under 35 U.S.C. 154(b) by 782 days.

(21) Appl. No.: 17/787,919

(22) PCT Filed: Dec. 20, 2019

(86) PCT No.: PCT/CN2019/126880
§ 371 (c)(1),
(2) Date: Jun. 21, 2022

(87) PCT Pub. No.: WO2021/120149
PCT Pub. Date: Jun. 24, 2021

(65) Prior Publication Data
US 2023/0040771 A1    Feb. 9, 2023

(51) Int. Cl.
*C08J 11/16* (2006.01)

(52) U.S. Cl.
CPC ............ *C08J 11/16* (2013.01); *C08J 2300/16* (2013.01)

(58) Field of Classification Search
CPC ....................................................... C08J 11/16
See application file for complete search history.

(56) References Cited

U.S. PATENT DOCUMENTS

| | | | |
|---|---|---|---|
| 4,743,391 A | 5/1988 | Gordon et al. | |
| 5,006,608 A | 4/1991 | Gardiner et al. | |
| 5,905,168 A | 5/1999 | Dos Santos et al. | |
| 6,153,705 A | 11/2000 | Corpart et al. | |
| 6,545,098 B1 | 4/2003 | Bouhadir et al. | |
| 6,777,513 B1 | 8/2004 | Destarac et al. | |
| 6,812,291 B1 | 11/2004 | Corpart et al. | |
| 2003/0045661 A1 | 3/2003 | Destarac et al. | |
| 2020/0024420 A1* | 1/2020 | Castillo .................. | C07C 67/60 |

FOREIGN PATENT DOCUMENTS

| | | |
|---|---|---|
| CN | 101362834 A | 2/2009 |
| CN | 102177198 A | 9/2011 |
| CN | 105849191 A | 8/2016 |
| CN | 110527137 A | 12/2019 |
| EP | 0798311 A1 | 10/1997 |
| FR | 2794464 A1 | 12/2000 |
| WO | 9413616 A1 | 6/1994 |
| WO | 9630421 A1 | 10/1996 |
| WO | 9801478 A1 | 1/1998 |
| WO | 9858974 A1 | 12/1998 |
| WO | 9931144 A1 | 6/1999 |
| WO | 9935177 A1 | 7/1999 |
| WO | 9935178 A1 | 7/1999 |
| WO | 0075207 A1 | 12/2000 |
| WO | 0142312 A1 | 6/2001 |
| WO | 0226836 A2 | 4/2002 |
| WO | 2010043293 A1 | 4/2010 |
| WO | 2015021356 A1 | 2/2015 |
| WO | WO-2018143798 A1 * | 8/2018 ............ B01J 23/745 |

OTHER PUBLICATIONS

Machine Translation of CN 206434892 by Gao. (Year: 2017).*
Machine translation of CN 101362834 by Wang et al.(Year: 2009).*
Ramsden, D.K. et al. "Degradation of Polyacrylamide in Aqueous Solution Induced by Chemically Generated Hydroxyl Radicals Part I—Fenton's Reagent". Polymer Degradation and Stability 14 (1986) 217-229. (Year: 1986).*
George Akiyama, et al., "Cellulose Hydrolysis by a New Porous Coordination Polymer Decorated with Sulfonic Acid Functional Groups" 2011 , Adv. Mater. 2011, 23, 3294-3297 DOI: 10.1002/adma.201101356 (5 pages).
H. Kaczmarek et al., Photo-oxidative degradation of some water-soluble polymers in the presence of accelerating agents, Die Angewandte Makromolekulare Chemie, Jan. 1, 1998, vol. 261 (1), 109-121 (13 pages).
Xu Zhao, Solid-phase photocatalytic degradation of polyethylene plastic under UV and solar light irradiation, Journal of Molecular Catalysis A: Chemical 268 (2007) 101-106 (6 pages).
International Search Report issued in International Application No. PCT/CN2019/126880, mailed Aug. 26, 2020 (3 pages).
Written Opinion issued in International Application No. PCT/CN/2019/126880, mailed Aug. 26, 2020 (4 pages).
Chinese Search Report issued in Chinese Application No. 201980103167.1, mailed on May 11, 2023 (4 pages).
Yeung, Celine W. S. et al. "Polyolefins and Polystyrene as Chemical Resources for a Sustainable Future: Challenges, Advances, and Prospects", ACS Materials Letters, vol. 3, No. 12, Oct. 29, 2021 (2021-0-29), pp. 1660-1676 (17 pages).

(Continued)

*Primary Examiner* — Christina H.W. Rosebach
(74) *Attorney, Agent, or Firm* — Osha Bergman Watanabe & Burton LLP

(57) ABSTRACT

The instant invention concerns a process for fragmenting a polymer chain, comprising an oxidative degradation step wherein the polymer chain is contacted with a reduced form of a metal M and an oxidant such as dioxygen, and wherein the polymer carries covalently bound chemical groups acting as a ligand of said reduced form of the metal M.

The invention also relates to methods making use of this fragmentation process as a first step of a degradation process of the polymer especially useful for avoiding the negative impact of a polymer to the environment. In this connection, the invention relates to the use of polymers carrying chemical groups acting as a ligand for a reduced form of a metal M, as a polymer biodegradable in an environment wherein the reduced form of a metal M is present.

10 Claims, No Drawings

(56) References Cited

OTHER PUBLICATIONS

Zahorodna, M. et al. "Application of the Fenton process to the dissolution and mineralization of ion exchange resins", Catalysis Today, Elsevier, Amsterdam, NL, vol. 129, No. 1-2, Oct. 25, 2007 (Oct. 25, 2007), 200-206 (7 pages).
Mai, C et al. "Degradation of acrylic copolymers by Fenton's reagent", Polymer Degradation and Stability, Barking, GB, vol. 75, No. 1, Jan. 1, 2002 (Jan. 1, 2002), pp. 107-112 (6 pages).
Chow, Cheuk-Fai et al. "Combined Chemical Activation and Fenton Degradation to Convert Waste Polyethylene into High-Value Fine Chemicals", Chemistry—A European Journal, John Wiley & Sons, Inc, DE, vol. 22, No. 28, Jun. 1, 2016 (7 pages).
Yui, Nobuhiko et al. "Inflammation responsive degradation of crosslinked hyaluronic acid gels", Journal of Controlled Release, Elsevier, Amsterdam, NL, vol. 22, No. 2, Oct. 1, 1992 (Oct. 1, 1992), pp. 105-116 (12 pages).
Extended European Search Report issued in corresponding EP Application No. 19957034.2 dated Jul. 10, 2023 (15 pages).

\* cited by examiner

PROCESS FOR FRAGMENTING A POLYMER

The instant invention relates to the field of the fragmentation of polymer chains into chemical species of lower molecular weight, which can especially allow a degradation of a polymer in view to reduce its impact to the environment.

Several methods have been proposed for fragmentating polymer chains, including mainly hydrolysis, oxidation or photochemistry. Such approaches are e.g. depicted in *Advanced Materials* 23.29 (2011): 3294-3297 (about the sulfonic acid functionalized solid catalyzed hydrolysis of cellulose), WO9413616 A1 (about the hydrolysis of polyamide in nitric acid solution), *Die Angewandte Makromolekulare Chemie* 261.1 (1998): 109-121 (about the photo oxidative degradation of poly(acrylic acid) and poly(vinylpyrrolidone) in the presence of hydrogen peroxide).

The instant invention more specifically focused on the oxidative degradation of carbon-based polymer chains. Several processes and methods have been disclosed in this connection, that are described for example in the Journal of Molecular Catalysis A: Chemical 268 (2007) 101-106 (incorporation of $TiO_2$ in Polyethylene that enhances the polymer degradation significantly due to the photo-oxidative process), or in U.S. Pat. No. 4,743,391 (that describes the degradation of olefinic polymer in lubricant by organic peroxide or in U.S. Pat. No. 5,006,608 (related to a polymer degradation at high temperature in the presence of air and ferrocene, preferably in presence of a peroxide accelerator). In a nutshell, according to the oxidative degradation route, a polymer is contacted with (1) dioxygen; and (2) a metal in a reduced form. Redox reactions occur implying these two species, which lead to the formation of active radicals, such as hydroxyl radicals •OH, that induce a chain fragmentation (globally by cleavage of covalent carbon-carbon bonds).

An oxidative degradation of this type is for example used in some degradable plastic bags, which include polymers mixed with photo-sensitive metal oxide like $TiO_2$, that lead to a progressive degradation of the polymer when the bag in contact with oxygen. The oxidative degradation obtained in this scope is relatively efficient but has a drawback since it occurs even during the use of the bag, which limits the length of its use.

Besides, the oxidative degradation tends to be less efficient in the case of polymer solubilized or dispersed in a liquid medium. Solutions have been suggested for enhancing the degradability of polymers in liquid medium, but they are not fully suitable. Especially, it has been proposed to introduce fragile points (weak groups) within the backbone of polymer chains, but this tends to induce a loss of stability of the polymer during its use and also a generation to microplastics (in the case of polymeric materials) since the polymer tends to be degraded only at the fragile points, with the rest of the chain remaining undegraded.

One aim of the instant invention is to provide an enhanced method of fragmentating a carbon-based polymer chain avoiding these drawbacks.

To this end, the invention proposes to make use of specific polymers that carry ligands of a metal M in a reduced form which enhances the efficiency of the degradation. The generic term "metal in a reduced form" (also referred as "reduced form of a metal M" or "oxidizable form of a metal M") as used in the instant description refers to a chemical species (typically a cation), based at least on said metal M, and which is oxidizable in the presence of an oxidant, for example dioxygen.

More precisely, one subject-matter of the instant invention is a process for fragmenting a polymer chain into chemical species of lower molecular weight than said polymer chain, comprising an oxidative degradation step wherein the polymer chain is contacted with a reduced form of a metal M and an oxidant of said reduced form (typically dioxygen), and wherein the polymer chain comprises chemical groups acting as a ligand of said reduced form of metal M, said groups being covalently bound to the polymer.

Typically, the oxidant used in the scope of the process of the invention is dioxygen, for example dioxygen present in the ambient atmosphere. According to specific embodiments, the process of the invention may be carried out by replacing all or part of the dioxygen by another oxidant, for example ozone. Besides, the oxidative degradation implemented in the process of the invention is advantageously carried out in the presence of water.

According to a preferred embodiment, the polymer chain subject to the process of fragmentation of the invention is solubilized or dispersed in a liquid medium when contacted with dioxygen and the reduced form of metal M. According to this embodiment, the reduced form of metal M is preferably soluble in the liquid medium.

The work made by the inventors in the scope of the instant invention has now shown that the presence of the ligand groups enhances the efficiency of the oxidative degradation, especially when the polymer chain is solubilized or dispersed in a liquid medium. Without intending to be linked to any specific theory, it is supposed that the presence of the ligand covalently bound to the polymer increases the probability for the generated radicals to contact the polymer chain and hence the strength of the degradation. Especially in conditions wherein the polymer chains would not necessarily be in close contact to the generated active radicals in the absence of the ligand groups of the invention.

The oxidative degradation obtained in the scope of the instant invention may have several practical applications, including for example the delivery of chemical species of lower molecular weight from the polymer chain, but as a main application, the invention allows a degradation of the polymer in view of reducing its subsequent impact to the environment.

The oxidative degradation as obtained by the enhanced oxidative degradation provided by the invention generally does not allow per se a complete degradation of a polymer chain, but it provides nevertheless a quite similar advantage, namely a fragmentation of the polymer chains into smaller species that are able to be degraded, especially biodegraded. In other words, the process of the invention provides a first major step of degradation that converts the polymer chain into smaller species that are then much easier to degrade. A great advantage in this connection is that, when the polymer chain is a polymer that is not or poorly biodegradable prior a oxidative degradation (which is almost systematically the case, especially for polymer chain having a relatively high molecular weight), the process of the invention allows to transform the polymer chain into smaller species that become much easier to be biodegraded.

The oxidative degradation of the polymer chain as obtained according to the invention is therefore advantageously followed by a further degradation of the obtained chemical species, for example by a biodegradation.

To this end, according to a possible embodiment, the chemical species of reduced molecular weight as obtained by the oxidative degradation process of the invention may be subjected to a degradation or biodegradation in controlled conditions in a (bio)degradation unit.

According to an alternative very interesting embodiment, the chemical species of reduced molecular weight as obtained by the oxidative degradation process of the invention may be more simply left in conditions wherein a further degradation and/or biodegradation occurs. For example, according to an especially interesting embodiment of the invention, the oxidative degradation of the polymer chain may be carried out in an environment containing dioxygen, the reduced form of metal M and conditions for a subsequent (bio)degradation, e.g. microorganisms able to degrade the species obtained by the oxidative degradation process. That is a great advantage of the polymers chains useful according to the invention: because of the specific ligand groups they carry, they can be very simply degraded by just placing them in such an environment, which corresponds in fact to a great number of natural environment (wherein dioxygen, reduced forms of several metals (or oxidised forms together with reducing agent), and microorganisms are present).

In other words, the inventors have now made it evident that polymers even of high molecular weight that are today regarded as not or very poorly biodegradable are in fact much more degradable than expected, an potentially biodegradable in most of the natural environment when they are carrying the specific ligand groups used in the scope of the instant invention.

This would virtually allows to render any polymer degradable since it appears sufficient to simply incorporate to the structure of the polymer covalently bound ligand groups able to capture suitable reduced form of metal present in most of the natural environments. The works made by the inventors furthermore tend to show that a relatively reduced number of ligand groups seems to be sufficient to ensure a proper degradation, which allows one to contemplate a structure modification that does not dramatically affect the other properties of the polymer.

In that respect, another subject matter of the invention is a method of making use of a polymer chain as defined above and then degrading said polymer in order to avoid negative impact to the environment, including:
  (i) a step of making use of the polymer, typically in a liquid formulation; and then
  (ii) a degradation step of the polymer, including at least the fragmentation process as defined above, and preferably a further degradation, notably a biodegradation, as contemplated above.

The step (i) above corresponds to the "active life" of the polymer, where it can be used for several applications, especially in a dispersed or solubilized form in a liquid medium. The polymer may for example be used as a rheology agent, surface modification agent, an encapsulant, an active delivery agent, an adhesion promoter, a lubricant, a dispersant, a wetting agent, a defoamer, a biostimulant, a biocide, a sequestering agent, a super absorbent, or a flocculant, in several type of formulations, for example in home care, or personal care, or agrochemical, or industrial cleaning, or coatings, or (waste) water treatment, or oil and gas formulations.

The specific polymer chain used according to the invention is able to be implemented in step (i) without being subject to degradation, which is one great advantage. Even if it is easily degraded when in contact of dioxygen and the a reduced form of metal M, the polymer chain used according to the invention remains fully stable if it is not used in these conditions, which allows a proper use during step (i) without degrading the polymer. The polymers of the invention constitute in that respect a great improvement in comparison with the prior art polymer having fragile points in the backbone: a polymer chain as used in the instant invention carries a kind of latent (sleeping) fragility that does not affect stability during step (i): this fragility is revealed only when the polymer contacts dioxygen and the reduced form of the metal M in step (ii).

Hence, according to a preferred embodiment the polymer chain is not contacted with a reduced form of metal M during the step (i). To this end, the polymer may e.g. be used in a formulation free of the reduced form of metal M (and more generally of any reduced form of any metal that could lead to an oxidative degradation in contact with dioxygen). The polymer chain may also be used in step (i) in the presence of a metal scavenger able to avoid any contact of the polymer chain with the reduced form of metal M (and more generally of any reduced form of any metal than could lead to an oxidative degradation in contact with dioxygen). Typically, the metal scavenger and its concentration is chosen such as they favor the complexation of the reduced form of metal M with said metal scavenger, rather than with chemical groups acting as a ligand carried by the polymer chain. Such a metal scavenger may for example be selected from Dimercaptotriazine, ((methylazanediyl)bis(methylene))bis(phosphonic acid), 1-Hydroxyethane 1,1-diphosphonic acid, cysteine, tetrasodium ethylenediamine tetraacetate, triethanolamine, DOTA, trisodium dicarboxymethyl alaninate, Diethylenetriaminepentaacetic acid, Ethylenediamintetraphosphonic acid, 2-Phosphono-1,2,4-butane tricarboxylic acid, 2,2'-bipyridine-4,4'-dicarboxylic acid, MGDAmethylglycindiacetic acid (MGDA) and/or nitrilotrisacetic acid (NTA). Inorganic metal scavenger may also be used, for example fluoride for iron.

The step (ii) corresponds to a degradation step occurring after the active life of the polymer and wherein its latent fragility is revealed. Typically, the fragmentation process used in step (ii) is at least in part operated in the environment, by using a reduced form of a metal M naturally present in environment. Alternatively, step (ii) may be carried out in more controlled conditions in a degradation reactor, but the previous alternative is more interesting especially in terms of costs.

Yet another subject-matter of the invention is the use of a polymer chain carrying chemical groups acting as a ligand for a reduced form of a metal M naturally present in an environment, as a polymer biodegradable in said environment in presence of dioxygen.

Specific features and advantageous embodiments of the invention are described in more details hereinafter.

The Polymer Chain

The exact nature of a polymer chain used in the scope of the instant invention may vary in a very large extent.

Generally speaking, the polymer chain is typically bearing a carbon-based backbone, namely a backbone comprising (and most often consisting in) a chaining of carbon atoms liked by covalent chemical bond (typically simple C—C bounds or mixture of simple C—C and double C=C bounds). In some specific cases, the backbone of polymer chain may optionally comprise other atoms than carbon, for example hetero atoms such as N or O or S.

The presence of fragilities within the backbone of the polymer chain of the invention is not needed for obtaining the effects sought by the invention and it is interesting to make use of a polymer free of such fragilities at least for economical reasons, but such fragilities may optionally be present according to some specific embodiment of the invention. According to a preferred mode anyway, the backbone of the polymer chain is free of such fragilities, for example, according to a specific embodiment, it consists only in a chaining of carbon atoms liked by covalent chemical bond.

A polymer chain useful for the instant invention may typically be as obtained by a radical polymerization of ethylenically unsaturated monomers. More generally a polymer chain used according to the invention may be a synthetic polymer, for example a homo- or co-polymer of monomer units including for example olefins, acrylates, polyamides, polyesters, and/or polyurethanes, possibly further including ethylene oxide (EO) units and/or propylene oxide (PO) units.

Alternatively, a polymer chain useful according to the invention may be a polysaccharide or another natural polymer, or a derivative of such a natural polymer (for example grafted). As non limitative examples, the natural polymer may be a guar, starch (for example a starch of wheat, potato, tapioca or corn), cellulose or hemicellulose, xanthan gum, carrageenan, karaya gum, tara gum, Jia Nafen gum, cassia gum, konjac gum, fenugreek gum, locust bean gum, psyllium seed gum, mesquite gum, ivory fruit nectar gum, alginate, agar, tragacanth gum, ghatti gum, tamarind gum, xyloglucan, inulin, proteins or pectin.

Whatever its exact nature, the polymer chain used according to the invention is a polymer carrying chemical groups acting as a ligand of the reduced form of the metal M that allows the self degradation of the polymer when in contact with said reduced form of the metal M and oxygen.

To this end the polymer chain may be obtained:
by grafting on a pre-existing polymer chain carrying said chemical groups acting as ligands;
or
by polymerizing monomers including monomers carrying said chemical groups acting as ligands.

In most situations, it is advantageous for the chemicals groups acting as ligand to be homogeneously distributed within the structure of the polymer, in order to optimize the action on the whole polymer structure during the degradation, even after first cleavage of the polymer chains are obtained.

Even if it may be contemplated to make use of polymers consisting exclusively of monomer carrying proper ligand groups, in practice, a polymer typically contains a more reduced number of ligand groups, with a molar ratio of the number of ligand group to the number of monomer units in the monomer typically between 1% and 90%, more preferably between 2.5% and 50% and more preferably between 5% and 20%.

A preferred embodiment for obtaining a homogeneous distribution of the ligand groups within the polymer structure is to prepare the polymer M via a copolymerization of monomers mL carrying the aforesaid ligand groups and monomers m that do not carry such groups, and wherein said monomers mL and m have a similar reactivity in said copolymerization. Typically, said copolymerization is a radical copolymerization and monomers mL and m are ethylenically unsaturated monomers.

Hence, a polymer chain useful for the invention may typically be obtained by a process comprising a step wherein the at least the followings are placed in contact:
ethylenically unsaturated monomers (mL) that carry ligand groups as defined above; and
ethylenically unsaturated monomers (m) that do not carry such groups,
at least one radical polymerization initiator, this initiator typically being water-soluble or water-dispersible; and Optionally at least one radical polymerization control agent.

For the purposes of the present description, the term "radical polymerization control agent" means a compound which is capable of extending the lifetime of the growing polymer chains in a polymerization reaction and of conferring, on the polymerization, a living or controlled nature. This control agent is typically a reversible transfer agent as employed in controlled radical polymerizations denoted under the terminology RAFT or MADIX, which typically employ a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2 794 464 or WO 02/26836.

According to an advantageous embodiment, the radical polymerization control agent is a compound which comprises a thiocarbonylthio group —S(C=S)—. Thus, for example, it may be a compound which comprises a xanthate group (bearing —SC=S—O— functions), for example a xanthate. Other types of control agent may be envisaged (for example of the type used in CRP or in ATRP).

According to a particular embodiment, the control agent may be a compound of formula (A) below:

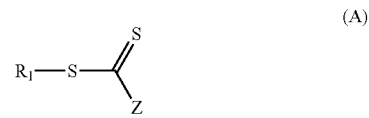

wherein:
Z is:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted acyloxy or carboxyl radical,
an optionally substituted aryloxy radical,
an optionally substituted carbamoyl radical,
a cyano radical,
a dialkyl- or diarylphosphonato radical,
a dialkyl-phosphinato or diaryl-phosphinato radical, or
a polymer chain,
and
$R_1$ represents:
an optionally substituted alkyl, acyl, aryl, aralkyl, alkene or alkyne group,
a saturated or unsaturated, aromatic, optionally substituted carbocycle or heterocycle, or
a polymer chain Advantageously, use is made, as control agent, of compounds bearing a xanthate —S(C=S)O—, trithiocarbonate, dithiocarbamate or dithiocarbazate function, for example bearing an O-ethyl xanthate function of formula —S(C=S) OCH$_2$CH$_3$ notably those bearing an O-ethyl xanthate —S(C=S)OCH$_2$CH$_3$ function, such as O-ethyl S-(1-(methoxycarbonyl)ethyl) xanthate (CH$_3$CH(CO$_2$CH$_3$))S(C=S)OEt.

Another possible control agent is dibenzyl trithiocarbonate of formula PhCH$_2$S(C=S)SCH$_2$Ph (where Ph=phenyl).

Whatever its nature and its preparation process, a polymer chain as used in the instant invention has typically a molecular mass of greater than 1 kg/mol, for example between 1,000 and 10,000,000 g/mol more preferably between 2,000 and 5,000,000 g/mol, more preferably between 2,000 and 2,000,000 g/mol. The molecular mass as referred here is the mean molecular by weight of the polymer Mw that may be measured especially by size exclusion chromatography The polymer chain is typically solubilized or dispersed in a liquid medium in the degradation process of the invention. In that case, the liquid medium including the polymer has typically a viscosity of less than 10,000 centipoise . . . (for example between 1 and 1,000 centipoise) as measured using a Brookfield RV viscometer at 25° C. and 10 RPM with suitable spindle. Typically the liquid medium is water or a medium comprising more than 50% by weight of water.

The Oxidative Degradation Step

The oxidant used in the scope of the degradation step of the invention may advantageously be the dioxygen naturally present in the air of the natural atmosphere. Hence, the oxidative degradation of the invention is typically made in aerobic conditions, namely in contact with the air of the atmosphere. However, the process of the invention may alternatively be carried out with other oxidants such as ozone, used in replacement or in addition to the dioxygen.

The only limit in the choice of the oxidant is that the reduced form of the metal M should be able to be oxidized into an upper degree of oxidation when in contact with the oxidant.

A reduced form of the metal M suitable for the invention may e.g. be selected among the species known in the art as able to induce an oxidative degradation in presence of dioxygen, including ionic or non ionic compounds based on a metal M selected from transition metals, lanthanides and actinides.

Besides, when the polymer is used in a dispersed or solubilized form in a liquid medium, the reduced form of the metal M is preferably a chemical species that is soluble in said liquid medium. Suitable species includes cations of a metal selected from transition metal, lanthanides and actinides, especially cations of a metal M selected from iron (Fe), manganese (Mn), Tungsten (W), Copper (Cu), cobalt (Co), Chromium (Cr), Molybdenum (Mo), Nickel (Ni) that are oxidized in presence of dioxygen, for examples cations Fe$^{2+}$, Mn$^+$, W$^{2+}$, or Cu$^+$. These cations are generally used in the form of corresponding salts, preferably soluble in the liquid medium where the polymer chain is used.

According to an interesting variant, the oxidative degradation step of the invention is carried out in presence of a reducing agent able to regenerate the reduced form of the metal M after its oxidation with dioxygen. This variant further enhances the efficiency of the oxidative degradation. This embodiment may be e.g. obtained by placing a polymer according to the invention in an environment comprising dioxygen and reducing agent. This may be for example a natural environment including a naturally present reducing agent, such as humic acid for example.

According to a preferred embodiment of the variant described in the previous paragraph, the reducing agent is a reducing group carried by the polymer chain, typically covalently bound to the polymer. This embodiment ensures that a reducing agent is systematically be present during the oxidation step, near to the reduced form of the metal M after its oxidation with dioxygen, which will enhance the efficiency of the regeneration of the active form of the metal M.

According to another variant, compatible with the one described above and making use of a reducing agent, the chemical groups acting as a ligand of the reduced form of metal M do not act as a ligand for the oxidized form(s) of the metal M obtained during the oxidative degradation, or act as a weaker ligand for this oxidized form than for the reduced form of metal M. This variant avoids a blocking of the ligand by the oxidized form(s) of the metal M: even if there is no reducing agent, the ligand will keep its ability to capture the reduced form of the metal M, whereby an enhancement of the efficiency of the oxidative degradation will be kept.

The Chemical Groups Acting as a Ligand

The nature of these groups, covalently bound to the polymer, will vary depending on the reduced form of metal M present during the oxidative degradation.

Typically, the chemical groups acting as ligands may be selected among polycarboxylates, amino acid, N-heteroaromatic chelators, polyamino chelators, and phenolic chelators.

Useful polycarboxylate groups may for example be citrate, malonate, succinate and Itaconate, maleate, 1,2,3,4-Butanetetracarboxylic acid (BTCA), malic acid, hemimellitene, phthalic acid, pyromellitate, or rhizoferrin. More generally, useful polycarboxylate groups may be obtained by covalently grafting to the polymer chain a compound that have the following general formula:

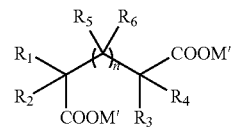

wherein:

n is a number ranging from 0 to 30; and each of $R_1$, $R_2$, $R_3$, $R_4$, $R_5$ and $R_6$ (when n is greater than 1, several groups $R_5$ and several $R_6$ are present that can be the same or distinct) is independently selected from the group consisting in: H, hydrocarbyl radical, heteroatom containing hydrocarbyl radical and —(CH$_2$)$_m$—R wherein:

m is a number ranging from 0 to 30;

R is selected from the group consisting in halide, —OH, —NR'R'', —CN, —OR', —COR', —CO—OR', —CONR'R'', —NR'—COR''R''', —SO3M', —SO$_4$M', and —COOM'; wherein:

each of R', R'' and R''' is independently H or a hydrocarbyl radical, or two or more of R', R'' and R''' may be linked together to form a double C=C bond or a ring structure.

M' is selected from the group consisting in H; alkali metal cation; alkaline earth metal cations; and ammonium.

Useful amino carboxylate groups are obtained by covalently grafting to the polymer chain a compound that have the following general formula:

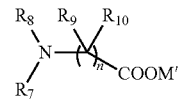

wherein:
n is a number distinct from zero (when n>1, the group contain several R9 and R10 groups that can be distinct of the same)
each of $R_7$, $R_8$, $R_9$, and $R_{10}$ is independently selected from the group consisting in: H, hydrocarbyl radical, heteroatom containing hydrocarbyl radical, and —$(CH_2)_m$—R, wherein:
m is a number ranging from 0 to 30; and
R is selected from halide, —OH, —NR'R", —CN, —OR', —COR', —CO—OR', —CONR'R", —NR'—COR"R'", —SO3M', —SO$_4$M', —COOM'; wherein:
each of R', R" and R'" is independently H or a hydrocarbyl radical, or two or more of R', R" and R'" may be linked together to form a double C=C bond or a ring structure.
M' is selected from H, alkali metal cation, alkaline earth metal cations or ammonium.

Examples of suitable amino carboxylate groups include aspartate, ethylene diamine tetraacetate (EDTA), Trisodium dicarboxymethyl alaninate (MGDA), nitrilotriacetate, glycine, proline, ethylenediamine N,N'-disuccinate, threonine. 2,2'-azanediyldiacetate, diethylenetriaminepentaacetate, ethylene glycol-bis(β-aminoethyl ether)-N,N,N',N'-tetraacetate, 1,2-bis(o-aminophenoxy)ethane-N,N,N',N'-tetraacetate, etc.

Useful N-heteroaromatic chelators groups are obtained by covalently grafting to the polymer chain a compound that have the following general formula:

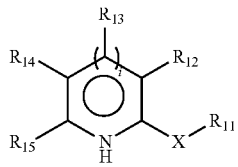

wherein:
i is 0 or 1; and
each of $R_{11}$, $R_{12}$, $R_{13}$, $R_{14}$, $R_{15}$ is independently selected from the group consisting in: H, hydrocarbyl radical, heteroatom containing hydrocarbyl radical, and —$(CH_2)_m$—R, wherein
m is a number ranging from 0 to 30; and
R is selected from halide, —OH, —NR'R", —CN, —OR', —COR', —CO—OR', —CONR'R", —NR'—COR"R'", —SO3M', —SO$_4$M', —COOM'; wherein
each of R', R" and R'" is independently H or hydrocarbyl radical, or two or more of R', R" and R'" may be linked together to form a double C=C bond or a ring structure.
M' is selected from H, alkali metal cation, alkaline earth metal cations or ammonium; and
X is selected from alkylenyl, amino, ether, alcohol, carbonyl groups.

Examples of useful N-heteroaromatic chelators groups include picolinic acid, pyridine-2,6-dicarboxylate, 2,2'-bipyridine, 2,2':6',2"-terpyridine, porphyrin, phthalocyanine, 2,6-bis(pyridin-2-ylmethyl)pyridine, N-methyl-1-(pyridin-2-yl)-N-(pyridin-2-ylmethyl)methanamine, quinolin-8-ol, 2,6-bis(1-methyl-1H-benzo[d]imidazol-2-yl)pyridine, 2,2':6',2":6",2'":6'",2""-quinquepyridine, 1,10-phenanthroline, etc.

Useful polyamino/ether chelators groups are obtained by covalently grafting to the polymer chain a compound that have the following general formula:

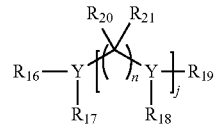

wherein:
n is a number ranging from 1 to 30; and
j is a number ranging from 1 to 20; and
each of $R_{16}$, $R_{17}$, $R_{18}$, $R_{19}$, $R_{20}$, $R_{21}$ is independently selected from the group consisting in: H, hydrocarbyl radical, heteroatom containing hydrocarbyl radical, and —$(CH_2)_m$—R, wherein:
m is a number ranging from 0 to 30; and
R is selected from the group consisting in halide, —OH, —NR'R", —CN, —OR', —COR', —CO—OR', —CONR'R", —NR'—COR"R'", —SO3M', —SO$_4$M', and —COOM', wherein
each of R', R" and R'" is independently H or hydrocarbyl radical, or two or more of R', R" and R'" are linked together to form a ring structure.
M' is selected from H, alkali metal cation, alkaline earth metal cations or ammonium; and
Y=O or N.

Examples of suitable polyamino/ether chelators groups include tris(2-aminoethyl)amine, cyclen, 1,4,7-trimethyl-1,4,7-triazacyclononane, 1,4,7-triazacyclononane, 1,1,1-Tris (aminomethyl)ethane, cyclam, $N^1$-(2-(dimethylamino) ethyl)-$N^1$,$N^2$, $N^2$-trimethylethane-1,2-diamine, $N^1$-(3-(dimethylamino)propyl)-$N^1$,$N^3$,$N^3$-trimethylpropane-1,3-diamine, 1,5,9-trimethyl-1,5,9-triazacyclododecane, 2,2',2"-(1,4,7-triazonane-1,4,7-triyl)triacetic acid, 12-crown-4 ether, 15-crown-5 ether 18-crown-6, dibenzo-18-crown-6 ether, and diaza-18-crown-6 ether.

Suitable polyphenol groups are obtained by covalently grafting to the polymer chain a compound that have the following general formula:

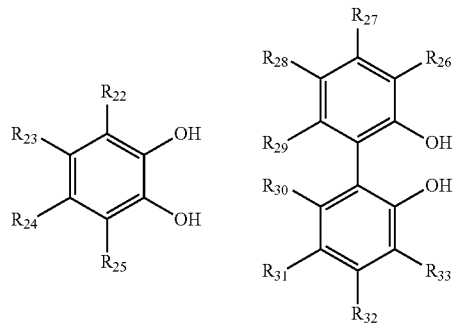

wherein:

each of $R_{22}$, $R_{23}$, $R_{24}$, $R_{25}$, $R_{26}$, $R_{27}$, $R_{28}$, $R_{29}$, $R_{30}$, $R_{31}$, and $R_{32}$ is independently selected from the group consisting in: H, hydrocarbyl radical, halide, —OH, —NO$_2$, —CN, —OR', —O—CO—R', —COR', —CO—OR', —NR'R", —CONR'R", —NR'—COR"R'", —NR'—CO—NR"R'", —SO$_3$M', —SO$_4$M', and —COOM', wherein:

R', R" and R'", independently from each other, are H or hydrocarbyl radical; and M' is selected from the group comprising H, alkali metal cation, alkaline earth metal cations or ammonium;

or two or more groups of $R_{22}$, $R_{23}$, $R_{24}$, $R_{25}$ and the skeleton of aromatic ring form a five or six membered ring;

or two or more groups of $R_{26}$, $R_{27}$, $R_{28}$, $R_{29}$, $R_{30}$, $R_{31}$, and $R_{32}$, optionally a —OH group, and the skeleton of aromatic ring form together a five or six membered ring.

Examples of suitable polyphenol groups include: sodium 3,4-dihydroxybenzenesulfonate; 3,4-dihydroxybenzoic acid; 3,4-dihydroxy-N-methylbenzamide; ethyl 3,4-dihydroxybenzoate; sodium 6,7-dihydroxynaphthalene-2-sulfonate; sodium 6,7-dihydroxynaphthalene-1,3-disulfonate; sodium 6,7-dihydroxynaphthalene-1,3-dicarboxylate; sodium 6,7-dihydroxyquinoline-3-carboxylate; 6,7-dihydroxy-2H-chromen-2-one; (E)-3-(3,4-dihydroxyphenyl)acrylic acid; sodium 6,6'-dihydroxy-[1,1'-biphenyl]-3,3'-disulfonate; sodium 2',6-dihydroxy-[1,1'-biphenyl]-3-sulfonate; sodium 2,2'-dihydroxy-[1,1'-binaphthalene]-5-sulfonate; 2,2'-dihydroxy-[1,1'-binaphthalene]-5-carboxylic acid; Methyl 2,2',5',6'-tetrahydroxy-[1,1'-binaphthalene]-5-carboxylate; Ellagic acid.

These ligands groups may be bound to the polymer chain (and to the monomers used for their preparation) via ester, amide, ether, amino groups.

A polymer chain suitable according to the invention (illustrated in the appended examples) is e.g. a polymer obtained by copolymerization of acrylamide grafted with citrate or other polycarboxylates or a polymer containing acrylamide units that are post-grafted with citrate or other polycarboxylates. This kind of polymer is typically used in association with non active cations (Na$^+$ or NH$_4^+$ for example) during step (i) of the process making use of the polymer chain.

As used in the instant description, the term "hydrocarbon group" refers to a group mainly consisting of carbon atoms and hydrogen atoms, which group may be saturated or unsaturated, linear, branched or cyclic, aliphatic or aromatic. The term "hydrocarbyl" as used in the description denotes radicals which are based on hydrocarbons with the stated number of carbon atoms and which may be pure hydrocarbon radicals but may also have substituents or functions. Hydrocarbon groups of the present invention may be alkyl groups, alkenyl groups, alkynyl groups, aryl groups, alkylaryl groups, aryalkyl groups, heterocyclic groups, and/or alkylheterocyclic groups.

As used in the instant description, "alkyl" should be construed under the ordinary meaning. Alkyl groups include saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups. The term "aliphatic group" includes organic moieties characterized by straight or branched-chains, typically having between 1 and 22 carbon atoms. In complex structures, the chains may be branched, bridged, or cross-linked. Aliphatic groups include alkyl groups, alkenyl groups, and alkynyl groups.

As used in the instant description, "alkenyl" or "alkenyl group" refers to an aliphatic hydrocarbon radical which can be straight or branched, containing at least one carbon-carbon double bond. Examples of alkenyl groups include, but are not limited to, ethenyl, propenyl, n-butenyl, i-butenyl, 3-methylbut-2-enyl, n-pentenyl, heptenyl, octenyl, decenyl, and the like. The term "alkynyl" refers to straight or branched chain hydrocarbon groups having at least one triple carbon to carbon bond, such as ethynyl.

The term "aryl group" includes unsaturated and aromatic cyclic hydrocarbons as well as unsaturated and aromatic heterocycles containing one or more rings. Aryl groups may also be fused or bridged with alicyclic or heterocyclic rings that are not aromatic so as to form a polycycle, such as tetralin. An "arylene" group is a divalent analog of an aryl group.

The term "heterocyclic group" includes closed ring structures analogous to carbocyclic groups in which one or more of the carbon atoms in the ring is an element other than carbon, for example, nitrogen, sulfur, or oxygen. Heterocyclic groups may be saturated or unsaturated. Additionally, heterocyclic groups, such as pyrrolyl, pyridyl, isoquinolyl, quinolyl, purinyl, and furyl, may have aromatic character, in which case they may be referred to as "heteroaryl" or "heteroaromatic" groups.

The following examples illustrate the invention

EXAMPLE

The instant example relates to the schematic route depicted below:

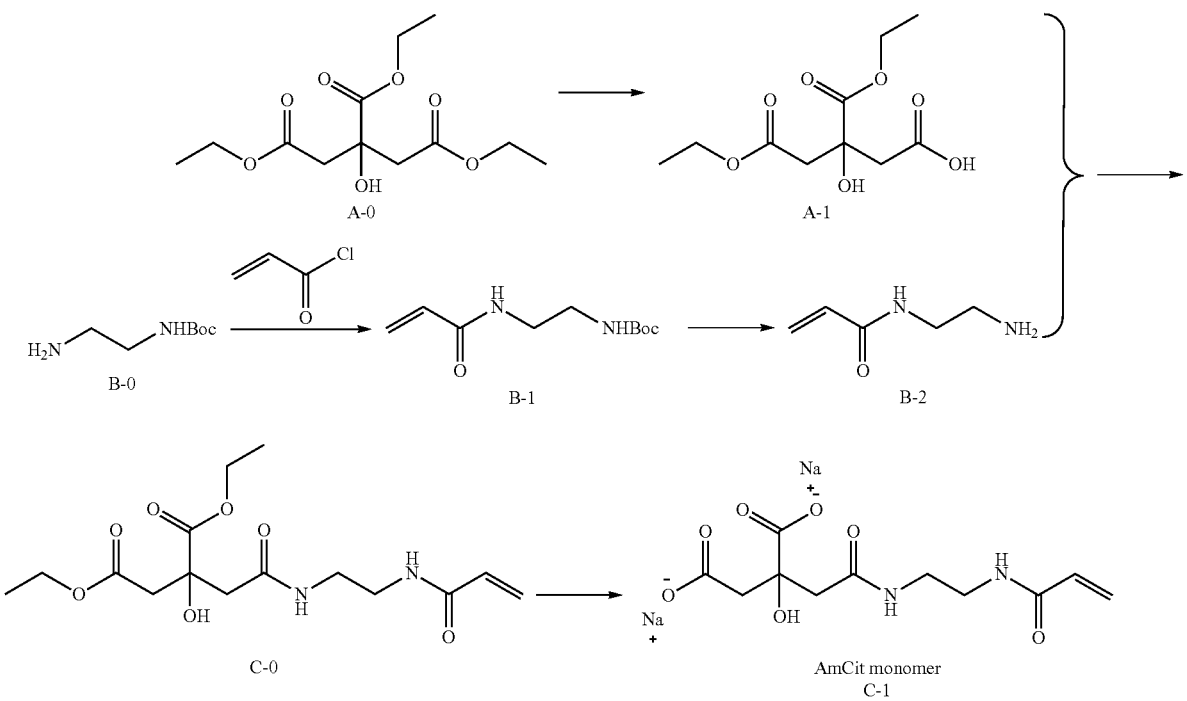

Synthetic Route Towards C-1

1. Synthesis of A-1

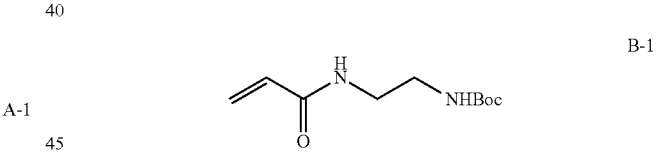

A-1

To a 500 mL three necked round bottom flask equipped with magnetic stirring, thermometer, triethyl citrate (1.0 equiv., 0.543 mol, 150 g) and the mixture of ethanol and water (totally 132 mL), sodium hydroxide (0.75 equiv., 0.407 mol, 16.3 g) were added consequently, and the solution was stirred at room temperature for 4.5 hours. The reaction mixture is then concentrated on a rotary evaporator then diluted with water. The pH is adjusted to 1 using 2N HCl aqueous solution. The aqueous solution is then extracted with a large excess of chloroform. The combined organic layers are dried over $MgSO_4$, filtered and concentrated to give 130 g of crude oil. It was purified by chromatography to give 45 g of product. Purity checked by $^1H$ NMR.

2. Synthesizes of B-1

B-1

To a 1000 mL three necked round bottom flask was equipped with magnetic stirring, thermometer, it was charged with 300 mL of water and sodium carbonate (4.0 equiv., 1.248 mol, 53 g) under stirring until all the solid dissolved, B-0 (1.0 equiv., 0.312 mol, 50 g) was added into, the mixture which was cooled at 0° C. in a ice bath. Afterwards acryl chloride (1.23 equiv., 0.384 mol, 34.57 g) in THF (150 mL) solution was added into the previous mixture drop-wise in 1 hour, and then the reaction mixture was stirred for 3 hours at room temperature before analysis. At the end of the reaction, the mixture solution was extracted by ethyl acetate (1000 mL×3), dried by $Na_2SO_4$, filtered and concentrated to give 66 g of product B-1 as pale yellow oil, without further purification.

3. Synthesize of B-2

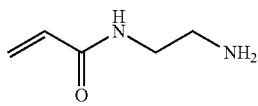

B-2

Molecular Weight: 114.15

To a 2000 mL three necked round bottom flask was equipped with magnetic stirring, thermometer, it was charged with 200 ml of ethyl acetate and 60 g of wet B-1. The solid was dissolved under stirring. 400 ml of 4M HCl in 1,4-dioxane solution was added afterwards, and then the reaction mixture was stirred at room temperature for 4 hours. Solid precipitated was filtered and washed with diethyl ether, dried under vacuum and 50 g light yellow solid was obtained.

4. Synthesize of C-0

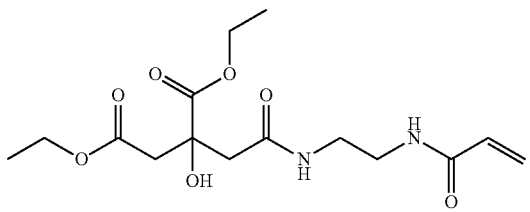

C-0

Molecular Weight: 344.36

To a 2000 mL three necked round bottom flask was equipped with magnetic stirring, thermometer, it was charged with 500 ml of dichloromethane and wet A-1 (1.0 equiv., 0.12 mol, 30.0 g). The solid was dissolved under stirring. EDCl·HCl (1-Ethyl-3-(3-dimethylaminopropyl)carbodiimide Hydrochloride) (1.2 equiv., 0.144 mol, 27.6 g), HOBT (Hydroxybenzotriazole) (1.1 equiv., 0.132 mol, 17.84 g), and B-2 (1.0 equiv., 0.12 mol, 18.07 g) were added into the solution consequently, and then followed by triethylamine (3.0 equiv., 0.36 mol, 36.43 g). The solution was stirred at room temperature for 3.5 hours. Finally, the reaction mixture was concentrated and purified by chromatography, product as yellow oil was obtained.

5. Synthesis of C-1 (AmCit Monomer)

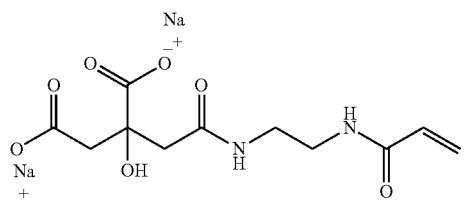

C-1

C-0 (1.0 equiv., 43.56 mol, 15 g) was dissolved in 100 ml of ethanol and 100 ml of water, cooled with ice bath. NaOH (2.0 equiv., 87.12 mol, 3.485 g) was added into the solution, and stirred for 2 hours. The reaction mixture was extracted with dichloromethane, and the aqueous phase was lyophilized which afforded 15 g of yellow solid as the final product AmCit monomer (M1).

Size exclusion chromatography was performed using the following equipment and conditions for the Polymer P1
- eluant: 100% water NaCl 100 mM, $NaH_2PO_4$ 25 mM, $Na_2HPO_4$ 25 mM, $NaN_3$ 100 ppm, pH=7
- Flow rate: 1 ml/min
- Columns: Shodex OHpak SB 804 HQ (3 columns 30 cm)
- Detection: RI (Agilent concentration detector)+MALS (MultiAngle Light Scattering) Mini Dawn HELEOS
- Sample concentration: around 0.5% (dry matter) in the mobile phase.
- Injection loop volume: 100 □l
- dn/dc=0.17 mL/g Size exclusion chromatography was performed using the following equipment and conditions for the Degradation tests 1-4
- eluant: 100% water NaCl 100 mM, $NaH_2PO_4$ 25 mM, $Na_2HPO_4$ 25 mM, $NaN_3$ 100 ppm, pH=7
- Flow rate: 1 ml/min
- Columns: Agilent Aquagel OH mixed H (3*30 cm+pre-column)
- Detection: RI (Agilent concentration detector)+MALS (MultiAngle Light Scattering) Mini Dawn HELEOS
- Sample concentration: around 0.1% (dry matter) in the mobile phase. To a stock solution of around 10 g of polymer solution in the mobile phase was added 50-100 mL of a solution of EDTA(Na2) (400 g/L)
- Injection loop volume: 100 □l
- dn/dc=0.17 mL/g Synthesis of a Copolymer P1 of Acrylamide and an Acrylamido Citrate Monomer (M1)

Into a 250 ml 3 necked round bottomed flask equipped with a magnetic stirrer and a reflux condenser and 2 Septa was added Acrylamide (50% in water, 18 g), AMCit (M1) 5.49 g, Deionised water 60.1 g, Ethanol 7.7 g. The solution was adjusted to pH 3 using H2SO4 (10%). Rhodixan A1 0.06 g was then added followed by V50 initiator 0.04 g. The solution was degassed by sparging with Nitrogen for 30 minutes. The reaction mixture was then heated to 70° C. under agitation and aged for 3 h. A further shot of V50 0.04 g was then added to the reaction mixture and the reaction allowed to proceed for a further 5 h whereupon it was cooled to room temperature. The solvent was removed using a rotary evaporator (50° C., 40 mbar, 4 h). Deionized water was then added in order to obtain a final polymer solution of around 20 w/w %.

The solids content measured using a thermal balance (115° C., 60 minutes) was 20.0% An NMR analysis revealed only trace residual monomers Size exclusion chromatography using a multiangle light scattering detector and an RI detector yielded the following result: Mw=555000 g/mol, Mn=109000 g/mol Degradation Test 1 of P1

Into a 20 ml glass vial equipped with a magnetic stirrer bar was added DI water 1.99 g and 0.14 g of acetic acid (99%). The solution was adjusted to pH 6 using a 30% sodium hydroxide (NaOH) solution. 2.5 g of P1 was then added to the solution. 5.11 g of a 3% solution of FeSO4·7H20 was then added to the stirred vial in one shot. The solution was allowed to stir overnight.

A 1.5 g sample of the solution was taken and 28 mg of Ethylene diamine tetraacetic acid added. The solution was warmed to 40° C. with stirring and then air dried before being submitted to size exclusion chromatography analysis. The results are summarized in the table below.

Degradation Test 2 of P1

Into a 20 ml glass vial equipped with a magnetic stirrer bar was added DI water 1.76 g and 0.18 g of acetic acid (99%). The solution was adjusted to pH 6 using a 30% sodium hydroxide (NaOH) solution (~0.3 g). 2.5 g of P1 was then added to the solution. 5.11 g of a 3% solution of FeSO4·7H20 was then added to the stirred vial in one shot. After 2 minutes 0.19 g of a 20% solution of D-(–)isoascorbic acid was added into the mixture. The solution was a stirred overnight.

The solution was subjected to size exclusion chromatography analysis. The results are summarized in the table below.

Degradation Test 3 of P1

Into a 20 ml glass vial equipped with a magnetic stirrer bar was added DI water 6.75 g and 0.18 g of acetic acid (99%). The solution was adjusted to pH 6 using a 30% sodium hydroxide (NaOH) solution. 2.5 g of P1 was then added to the solution. 0.07 g of a 3% solution of FeSO4·7H20 was then added to the stirred vial in one shot. After 2 minutes 0.27 g of a 20% solution of D-(–)isoascorbic was added into the mixture. The solution was a stirred overnight.

A 1 g sample was removed and used to perform size exclusion chromatography analysis. The results are summarized in the table below.

Degradation Test 4

To the remainder of the solution from degradation test 3 was added 0.25 g of a 20% solution of D-(–)isoascorbic. The solution was left to stir overnight whereupon it was used to perform size exclusion chromatography analysis.

The results are summarized in the table below.

| Degradation test | Mw g/mol | Mw(test)/ Mwref |
|---|---|---|
| Reference (P1) | 555000 | 1 |
| 1 | 156000 | 3.5 |
| 2 | 75000 | 7.4 |
| 3 | 81000 | 6.9 |
| 4 | 39000 | 14.2 |

What is claimed is:

1. A process for fragmenting a polymer chain into chemical species of lower molecular weight than the polymer chain, the process comprising an oxidative degradation step wherein the polymer chain is contacted with a reduced form of a metal M and an oxidant,
   wherein the polymer chain comprises chemical groups acting as a ligand of the reduced form of the metal M, the groups being covalently bound to the polymer, and
   wherein the chemical groups acting as ligands are selected from the group consisting of polycarboxylates, amino acid, N-heteroaromatic chelators, polyamino chelators, phenolic chelators, and combinations thereof.

2. The process of claim 1, wherein the polymer chain is solubilized or dispersed in a liquid medium.

3. The process of claim 1, wherein the reduced form of the metal M is oxidized in the presence of the oxidant, and wherein the oxidative degradation step is carried out in presence of a reducing agent able to regenerate the reduced form of the metal M after its oxidation with the oxidant.

4. The process of claim 3, wherein the reducing agent is a reducing group carried by the polymer chain.

5. The process of claim 1, wherein the reduced form of the metal M is oxidized in the presence of the oxidant, and wherein the chemical groups acting as a ligand of the reduced form of the metal M do not act as a ligand for the oxidized form(s) of the metal M obtained during the oxidative degradation, or act as a weaker ligand for the oxidized form(s) of the metal M than for the reduced form of the metal M.

6. The process of claim 1, wherein the oxidative degradation of the polymer chain is followed by a further degradation of the obtained chemical species.

7. A method for degrading a polymer chain as defined in claim 1 to avoid negative impact to an environment, the method comprising:
   (i) a step of applying the polymer in a formulation; and
   (ii) a degradation step of the polymer, comprising at least the fragmentation process of claim 1.

8. The method of claim 7, wherein the polymer chain is not contacted with a reduced form of a metal M during the step (i).

9. The method of claim 7, wherein the fragmentation process used in step (ii) is at least in part operated in the environment, by using a reduced form of a metal M naturally present in the environment.

10. The method of claim 1, wherein the oxidant is dioxygen.

* * * * *